United States Patent [19]

Boehme

[11] 3,902,681

[45] Sept. 2, 1975

[54] TAPE HANDLING APPARATUS

[75] Inventor: Ferdinand J. Boehme, Spring Valley, Minn.

[73] Assignee: Telex Communications, Inc., Minneapolis, Minn.

[22] Filed: Jan. 28, 1974

[21] Appl. No.: 437,333

[52] U.S. Cl. .................................. 242/198; 360/96

[51] Int. Cl.$^2$ .......................................... G11B 23/10

[58] Field of Search ........... 242/198, 199, 200, 180, 242/181; 360/93, 96

[56] References Cited

UNITED STATES PATENTS

| | | | |
|---|---|---|---|
| 3,675,876 | 7/1972 | Frederick | 242/198 |
| 3,729,202 | 4/1973 | Wakabayashi | 242/198 |

FOREIGN PATENTS OR APPLICATIONS

| | | | |
|---|---|---|---|
| 1,162,682 | 8/1969 | United Kingdom | 242/198 |

*Primary Examiner*—George F. Mautz
*Attorney, Agent, or Firm*—Warren A. Sturm

[57] ABSTRACT

A cassette handling arrangement for a tape machine in which a cassette receiving door is rotatably disposed over a tape utilization station. A Z-spring mounted on the door cooperates with a rib on the door to be releasably latched in a retracting position as a cartridge is received in the door. A rib in the housing for the tape machine is disposed adjacent the door to engage the spring as the door is closed to place the cartridge in playing position so as to unlatch the spring and bias the cassette toward a playing position. As the door is opened to change or remove a cassette, the spring biases the cassette in the door to an outward position whereat it may be easily handled. A torsion spring is mounted on a retainer to coact with the housing for the tape machine and the cassette receiving door and the housing include complimentary receptacles and ribs to provide a pivot.

4 Claims, 8 Drawing Figures

TAPE HANDLING APPARATUS

SUMMARY OF THE INVENTION

My invention is directed to tape handling apparatus and is particularly directed to tape handling apparatus of the class wherein a tape to be processed is contained within a cartridge or cassette and the cartridge or cassette is to be removably disposed into or on a playing station within the body of the housing of the tape handling apparatus. The prior art abounds with various and sundry apparatus for accomplishing this end.

My invention comprises a rotatable cartridge receiving means or door that is disposed adjacent to the tape handling station in a tape processing machine which contains suitable driving mechanism for engaging the cassette to cause the tape to move internally and appropriately located transducing heads or other apparatus for performing an operation on the tape for coacting therewith to process information to and from the tape.

My apparatus procides a novel and improved means for ejecting a cartridge when the door is caused to move from a closed to an open position, a novel and improved pivoting arrangement for pivotally disposing the door adjacent the cartridge processing station and an improved biasing arrangement for urging the door to an open position. Each of these features is explained in more detail in the detailed description to follow and is further described in the claims appended hereto.

It is therefore an object of my invention to provide a novel and improved cartridge receiving and handling apparatus for use in connection with tape processing equipment of the class utilizing tape cartridges for carrying and storing of a recording medium in the form of a tape.

Referring now to the drawings:

FIG. 8 is a fragmentary sectional view taken along section line 8—8 on FIG. 1.

Figure 1:
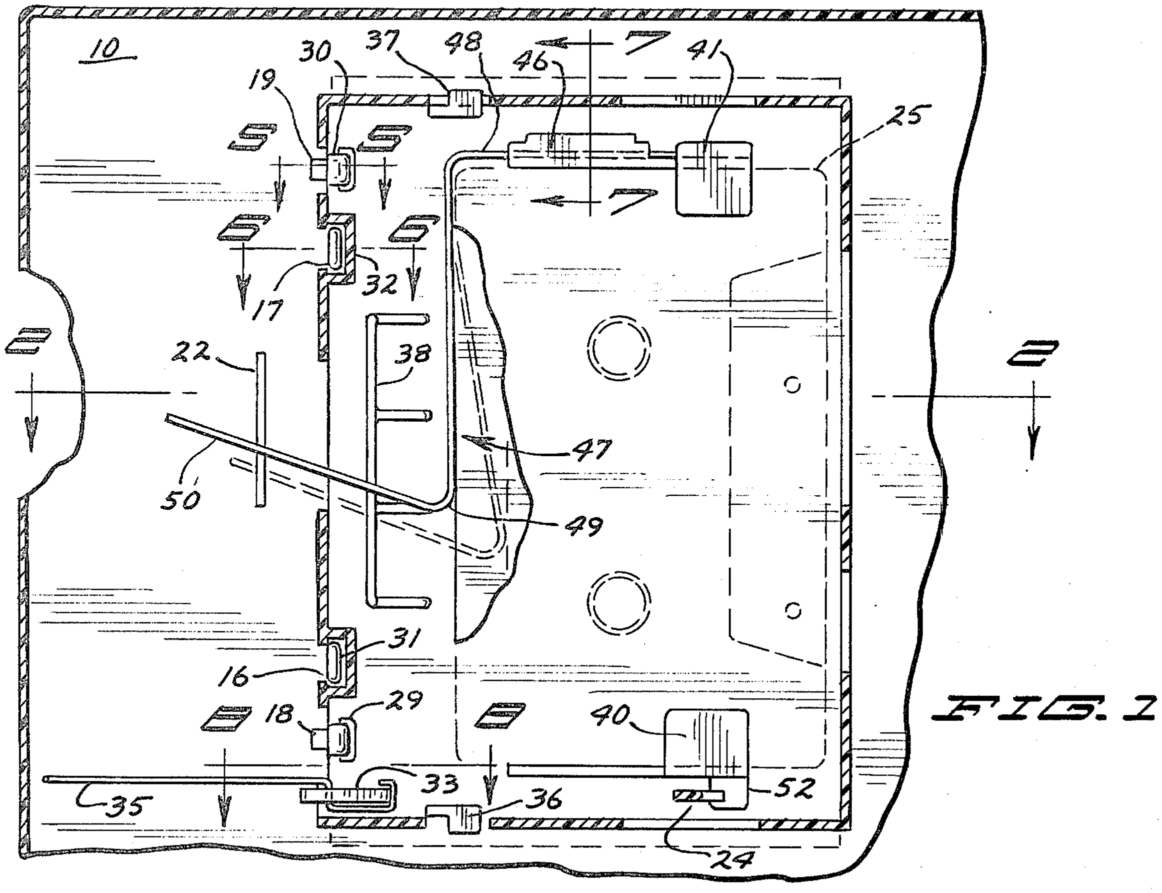
FIG. 1 is a fragmentary view of a portion of a conventional form of tape cassette processing apparatus, taken along section line 1—1 on FIG. 4, illustrating a preferred embodiment of my invention.

Referring now to the drawings, a generally conventional tape cassette processing machine has been indicated by reference character 10 and includes a top portion 11 and a tape processing or playing station 12. Tape station 12 is shown having a bottom portion 13 generally parallel to the top portion 11 of tape processing apparatus 10 and front and rear portion 13 and 14 extending substantially normal thereto. A pair of laterally spaced apart upwardly opening recesses 16 and 17 are disposed at the rear portion of tape station 12 as well as a pair of forwardly extending rib portions 18 and 19 for purposes to be described below. Tape station 12 also includes a pair of upwardly extending spindles 20 and 21 which are suitably formed to engage driving reels contained within a standard form of tape cartridge, known as a reel-to-reel cassette. In several views of the drawings, a typical cassette is indicated generally by reference character 25.

Figures 2, 6:
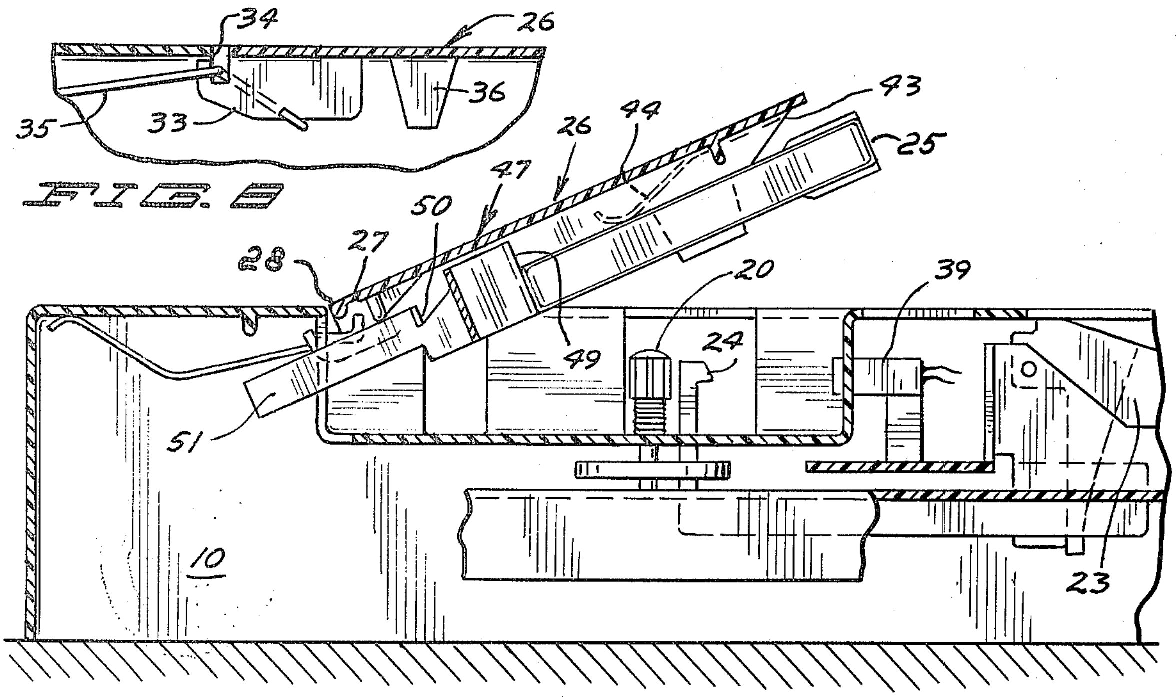
FIG. 2 is an enlarged fragmentary sectional view taken along section line 2—2 on FIG. 1.
FIG. 6 is a fragmentary sectional view taken along section line 6—6 on FIG. 1.

Extending downwardly from top portion 11 of tape processing apparatus 10 and in proximity to the rear portion of tape station 12, is an unlatching rib 22. At the right side of tape station 12, a movable, upwardly extending latch 24 is suitably configured and shaped to coact with a downwardly extending member 52 on a cartridge receiver 26 to latchably engage the same when receiver 26 is in a downward tape processing position. Latch 24 is operatively connected to a key member 23 at the forward front edge of tape processing apparatus 10 (as indicated in FIG. 2) for actuation thereby when it is desired to release cartridge receiving member 26 to an open position.

A cartridge receiving member shown in the form of door 26 is disposed in the upwardly opening aperture for station 12 in top 11 of tape apparatus 10 and includes a top 27 and a rear portion 28. It is rotatably secured to the rear portion of tape station 12 by coaction with elements 16, 17, 18 and 19 described above, with rearwardly opening recesses 29 and 30 and downwardly extending ribs 31 and 32 on the rear end 28 of door 26. A downwardly depending torsion spring retainer 33 is disposed at the left end off the rear 28 of door 26 and includes a notch 24, retainer 33 receives a torsion spring 35 in the disposition shown in FIGS. 1, 2, 4 and 8 of the drawings.

A pair of downwardly depending stop members are shown extending laterally into a pair of slots in the side walls of tape station 12 so as to limit the upward movement of door 26 as it is pivoted upwardly under the biasing force provided by torsion spring 35, these are identified as right and left stops 36 and 37. A latching rib 38 is shown extending downwardly adjacent the rear lower surface of top 27 of door 26 for engagement with a Z-shaped ejection spring 47, to be described below. A tape head 39 is shown in operative disposition near the front wall of tape station 12 for coaction with the tape in a cartridge when in the generally horizontal position indicated in FIG. 4 of the drawings.

A cartridge or cassette may be slidably received in between a pair of cartridge guide members 42 and 43, each of which contains a lower laterally extending portion 40 and 41, respectively, to retain the lower forward end of a cartridge at the desired position. A latch engaging portion 52 extends laterally of guide 40 to be engaged by latch 24. A pair of springs 44 and 45 are utilized to bias a cartridge downwardly toward lower end guides 40 and 41 to maintain the cartridge in the predetermined desired relative disposition with respect to the top of door 26. For the sake of clarity, elements 43 and 44 are shown in FIG. 2 of the drawing and element 45 remains hidden from view because of the sectional presentation. Cartridge guide 43 includes a slot 46 for receiving mounting end 48 of the Z-shaped ejection spring 47. Z-shaped spring 47 also includes a cartridge engaging intermediate portion 49 as well as a notch 50 for latching engagement with latching rib 38, on the bottom side of top 27 on door 26, and an unlatching end 51.

After the various subassemblies of my apparatus have been completed, the door, including the springs and the Z-shaped ejection spring is pivotably disposed over tape station 12 by interengagement between the recesses and ribs provided on the rear portion of the top of door 26 and the top of the rear wall of tape station 12. Right and left stop members 36 and 37 are depressed slightly inwardly to allow them to fit into the complimentary coacting slots in the side walls of tape station 12 and, torsion spring 35 having previously been assembled to its mounting rib 33 depending downwardly from the top of door 26, causes door 26 to remain in its upward open position.

Figures 3, 4, 5, 6, 7:
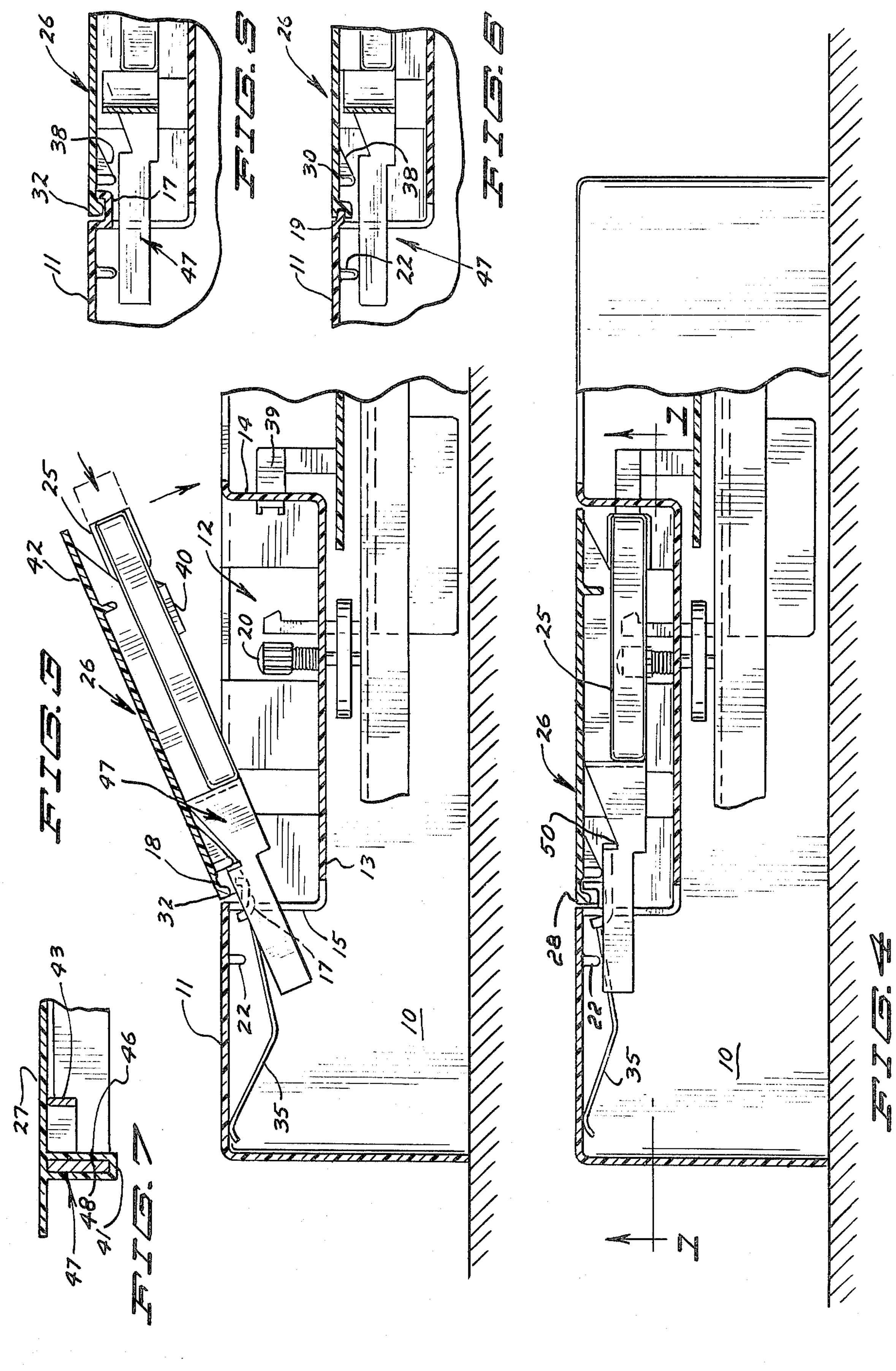
FIG. 3 is a similar fragmentary sectional view showing the apparatus of FIG. 2 in one condition or state during its operation.
FIG. 4 is a side elevational view, partly in section, illustrating my apparatus in another state of operation.
FIG. 5 is a fragmentary sectional view taken along section line 5—5 on FIG. 1.
FIG. 7 is a fragmentary sectional view taken along section line 7—7 on FIG. 1.

FIG. 1 illustrates the normal position of spring 47 in dotted outline and the solid outline for the spring 47 indicates its position after a cartridge, such as cartridge 25 has been inserted into cover 26. FIG. 2 shows the relationship of the elements prior to full insertion and FIG. 3 shows the relationship of the elements after the cartridge has been pushed all the way into Z-spring 47 with notch 50 in latching engagement with latching rib 38 on the lower surface of top 27 on door 26. When the cover is closed to allow the door latch 52 to be engaged by latch 24 in tape station 12, unlatching rib 22 depending downwardly from the top 11 of tape apparatus 10 engages unlatching end 51 of Zspring 47 to cause it to move downwardly and disengage notch 50 from latching rib 38 to allow it to assume the position shown in FIG. 4 of the drawings.

When it is desired to utilize the program material contained on the tape in cartridge 25, the normal and customary devices used to move a tape head, such as 39, in proximity to the tape and to drive spindles 20 and 21 (21 not shown) may be utilized. Such apparatus is well known to those skilled in the art concerning the illustrative embodiment. Other forms of tape utilization devices may occur upon becoming aware of the principles of my invention.

When it is desired to terminate the utilization of the program material contained in cartridge 25, the release, such as key 23 for latch 24, may be depressed and as door 26 assumes its open position of FIGS. 2 and 3, the force exerted outwardly by cartridge engaging portion 49 on Z-spring 47 displaces the cartridge outwardly to a position where it may easily be grasped by the fingers of an operator. FIGS. 5 and 6 illustrate the specific interrelationship between the pivoting members defined by the elements on door 26 and the top of tape apparatus 10 and FIG. 7 illustrates the mounting provided by slot 46 in guide 42.

Having now therefore fully illustrated and described my invention, what I claim to be new and desire to protect by Letters Patent is:

1. In a tape utilization device of the class including a housing and having a tape cartridge utilization station for removably receiving a cartridge containing a tape to be processed;

tape cartridge receiving means having a top, front and a rear portions, said rear portion being rotatably disposed on the housing and adjacent to the cartridge utilization station, said receiving means including means for slidably receiving a tape cartridge, said receiving means being operable between a first position remote from the utilization station and a second position whereby a cartridge in said receiving means is in operative engagement with said utilization station;

the rear portion of the receiving means and the housing adjacent said rear portion include at least two pair of pivots, one of each pair being comprised of a rib and receptacle disposed parallel to the top of the housing and the other of each pair being disposed normal to the top of the housing; and variable biasing means carried by said receiving means, said biasing means being operable to exert a forwardly directed force on a cartridge in said receiving means upon movement of said receiving means from said second to said first position.

2. The apparatus of claim 1 in which the receiving means includes a downwardly depending rib adjacent the rear portion, and the rib includes an upwardly opening slot adjacent the rear portion of the receiving means and a torsion spring is disposed with one end engaging the inside of the housing, and intermediate portion disposed in the slot in said rib and the other end on the bottom of said rib.

3. In a tape utilization device of the class including a housing and having a tape cartridge utilization station for removably receiving a cartridge containing a tape to be processed;

tape cartridge receiving means having a top, front and a rear portions, said rear portion being rotatably disposed on the housing and adjacent to the cartridge utilization station, said receiving means including means for slidably receiving a tape cartridge, said receiving means being operable between a first position remote from the tuilization station and a second position whereby a cartridge in said receiving means is in operative engagement with said utilization station;

the receiving means include a downwardly depending rib adjacent the rear portion, and the rib includes an upwardly opening slot adjacent the rear portion of the receiving means and a torsion spring is disposed with one end engaging the inside of the housing, an intermediate portion disposed in the slot in said rib and the other end on the bottom of said rib; and variable biasing means carried by said receiving means, said biasing means being operable to exert a forwardly directed force on a cartridge in said receiving means upon movement of said receiving means from said second to said first position.

4. In a tape utilization device of the class including a housing and having a tape cartridge utilization station for removably receiving a cartridge containing a tape to be processed;

tape cartridge receiving means having a top, front and a rear portions, said rear portion being rotatably disposed on the housing and adjacent to the cartridge utilization station, said receiving means including means for slidably receiving a tape cartridge, said receiving means being operable between a first position remote from the utilization station and a second position whereby a cartridge in said receiving means is in operative engagement with said utilization station, the rear portion of the receiving means and the housing adjacent said rear portion include at least two pair of pivots, one of each pair being comprised of a rib and receptacle disposed parallel to the top of the housing and the other of each pair being disposed normal to the top of the housing and said receiving means including a downwardly depending rib adjacent the rear portion, the rib including an upwardly opening slot adjacent the rear portion of the receiving means and a torsion spring is disposed with one end engaging the inside of the housing, an intermediate portion disposed in the slot in said rib and the other end on the bottom of said rib; and variable biasing means carried by said receiving means, said biasing means being operable to exert a forwardly directed force on a cartridge in said receiving means upon movement of said receiving means from said second to said first position, said variable biasing means comprising a Z-shaped spring having one end mounted on the bottom of the receiving means and being operable in a plane parallel to the top of the receiving means, said Z-shaped spring also including a notch in an intermediate topside and a latch therefor extending downwardly towards said spring from the top of the receiving means and further means on housing for releasing the notch from the latch when the receiving means is placed in said second position.

* * * * *